(12) United States Patent  
Souchkov

(10) Patent No.: US 8,797,294 B2
(45) Date of Patent: *Aug. 5, 2014

(54) CAPACITIVE TOUCHSCREEN SYSTEM WITH SWITCHABLE CHARGE ACQUISITION CIRCUIT

(71) Applicant: PixArt Imaging Inc., Hsin-Chu (TW)

(72) Inventor: Vitali Souchkov, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,023

(22) Filed: Aug. 28, 2013

(65) Prior Publication Data

US 2013/0342507 A1    Dec. 26, 2013

Related U.S. Application Data

(62) Division of application No. 12/819,635, filed on Jun. 21, 2010, now Pat. No. 8,547,359.

(51) Int. Cl.
*G06F 3/045* (2006.01)

(52) U.S. Cl.
USPC ......... 345/174; 345/173; 345/660; 178/18.03

(58) Field of Classification Search
USPC ........................................ 345/660; 178/18.03
See application file for complete search history.

(56) References Cited

U.S. PATENT DOCUMENTS

| | | | |
|---|---|---|---|
| 5,543,588 A | 8/1996 | Bisset | |
| 2005/0073324 A1 | 4/2005 | Umeda | |
| 2010/0045632 A1 | 2/2010 | Yilmaz | |
| 2011/0254802 A1 | 10/2011 | Philipp | |
| 2011/0310052 A1* | 12/2011 | Souchkov | ..................... 345/174 |

FOREIGN PATENT DOCUMENTS

CN    1603846 A    4/2005

* cited by examiner

*Primary Examiner* — Joseph Haley
*Assistant Examiner* — Ifedayo Iluyomade
(74) *Attorney, Agent, or Firm* — Winston Hsu; Scott Margo

(57) ABSTRACT

Disclosed herein are various embodiments of a capacitive touchscreen system which includes switchable charge acquisition circuits and corresponding charge integrator circuits for sensing mutual capacitances associated with a touchscreen. Various embodiments of the switchable charge acquisition circuits and corresponding charge integrator circuits provide lower power consumption, increased operational stability, substantially reduced integrated circuit area, and increased temperature stability.

6 Claims, 6 Drawing Sheets

CAPACITIVE TOUCHSCREEN SYSTEM WITH SWITCHABLE CHARGE ACQUISITION CIRCUIT

CROSS REFERENCE TO RELATED APPLICATIONS

This application is a division of U.S. patent application Ser. No. 12/819,635, filed Jun. 21, 2010, and included herein by reference in its entirety for all intents and purposes.

BACKGROUND OF THE INVENTION

1. Field of the Invention

Various embodiments of the invention described herein relate to the field of capacitive sensing input devices generally, and more specifically to a switchable charge acquisition circuit and accompanying circuitry for sensing mutual capacitances associated with a touchscreen.

2. Description of the Prior Art

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC™. Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger. The human body is essentially a capacitor to a surface where the electric field vanishes, and typically has a capacitance of around 100 pF.

Electrodes in self-capacitance touchpads are typically arranged in rows and columns. By scanning first rows and then columns the locations of individual mutual capacitance changes induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE™. In mutual capacitance measurement, capacitance is measured between two conductors, as opposed to a self-capacitance measurement in which the capacitance of a single conductor is measured, and which may be affected by other objects in proximity thereto.

Simultaneously driving of all drive electrodes or lines on a touchscreen can increase the dynamic range signals appearing on the sense electrodes or lines, and presented to the corresponding sense circuitry, according to the number of drive electrodes driven at one time. Handling the resulting increased dynamic range of charge signals presented to the sense circuitry can be accomplished by using conventional charge integrator readout circuits having increased feedback capacitor values. As alluded to above, such feedback capacitor values are increased according to the number of simultaneously driven drive electrodes, which in a large touchscreen may require an increase of feedback capacitance by a factor of 20 or more. If high drive voltages are used to increase touch signal noise immunity in a touchscreen, feedback capacitor values in charge integrator circuits incorporated into the sensing circuitry must also typically be increased. Large feedback capacitor values present certain well-known problems when actually implemented in a touchscreen system, however, such as an increased amount of area being required in an integrated circuit implementation. While active current division circuits preceding charge integrator circuits may be employed to reduce feedback capacitor size, doing so requires the use of additional amplifiers and resistors, which are less operationally and temperature stable components compared to capacitors.

What is needed is a capacitive measurement or sensing circuit or system that may be employed in touchscreen and touchpad applications that does not require the use of large feedback capacitors or the use of active current division circuits.

SUMMARY OF THE INVENTION

In one embodiment, there is a provided a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches, the input signals representing mutual capacitances and stray capacitances, each charge acquisition circuit further being operably connected to a corresponding charge integrator circuit to provide output signals thereto through the second output switches, wherein when the first input switches of each charge acquisition circuit are closed the capacitive input signals provided thereto by the second plurality of electrodes are transferred to the plurality of capacitors corresponding thereto, and when the first switches are subsequently opened and the second switches are closed the stored charge signals corresponding to each of the capacitors in the charge acquisition circuit are transferred to the charge integrator circuit through the second switches.

In another embodiment, there is provided a processor for a capacitive touchscreen comprising a first plurality of electrically conductive electrodes arranged in rows or columns, and a second plurality of electrically conductive electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, the processor comprising one or more drive circuits operably connected to the first plurality of electrodes, a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches, the input signals comprising mutual capacitances and stray capacitances, each charge acquisition circuit further being operably connected to a corresponding charge integrator circuit to provide output signals thereto through the second output switches, wherein when the first input switches of each charge acquisition circuit are closed the capacitive input signals provided thereto by the second plurality of electrodes are transferred to the plurality of capacitors corresponding thereto, and when the first switches are subsequently opened and the second switches are closed the stored charge signals corresponding to each of the capacitors in the charge acquisition circuit are transferred to the charge integrator circuit through the second switches.

In yet another embodiment, there is provided a method of measuring charges associated with mutual capacitances in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, the mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches, the input signals comprising mutual capacitances and stray capacitances, each charge acquisition circuit further being operably connected to a corresponding charge integrator circuit to provide output signals thereto through the second output switches, the method comprising closing the first input switches of the charge acquisition circuit such that the capacitive input signal provided by the corresponding one of the second plurality of electrodes is transferred to the plurality of capacitors corresponding thereto, opening the first switches and closing the second switches such that the stored charge signals corresponding to each of the capacitors in the charge acquisition circuit are transferred to the charge integrator circuit through the second switches.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION

Figure 1:
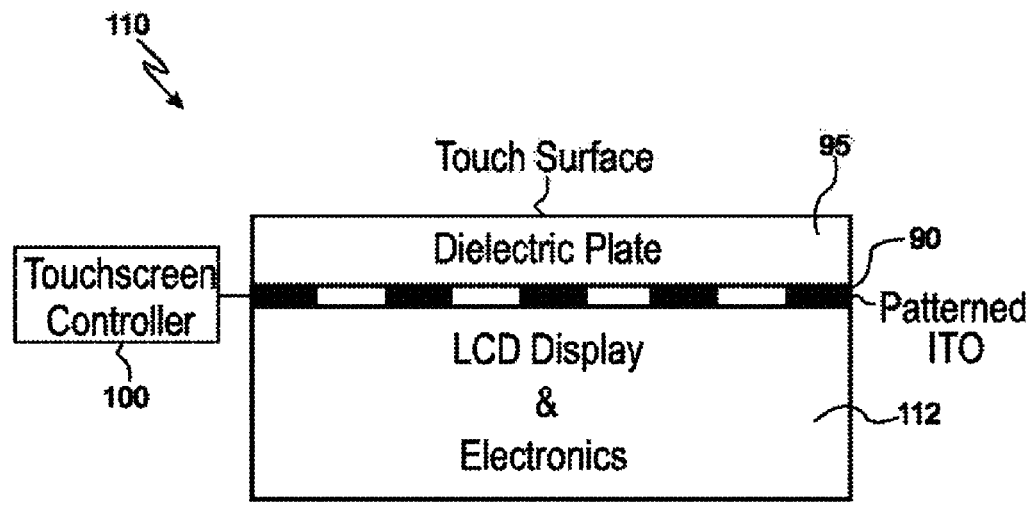
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath display 112.

Figure 2:
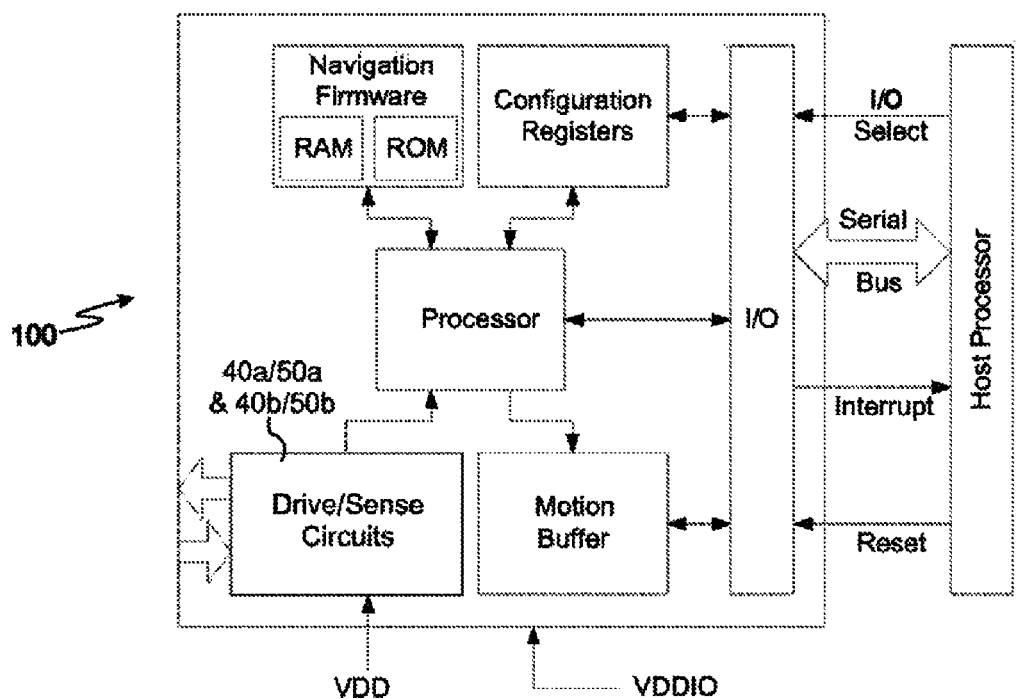
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000

ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
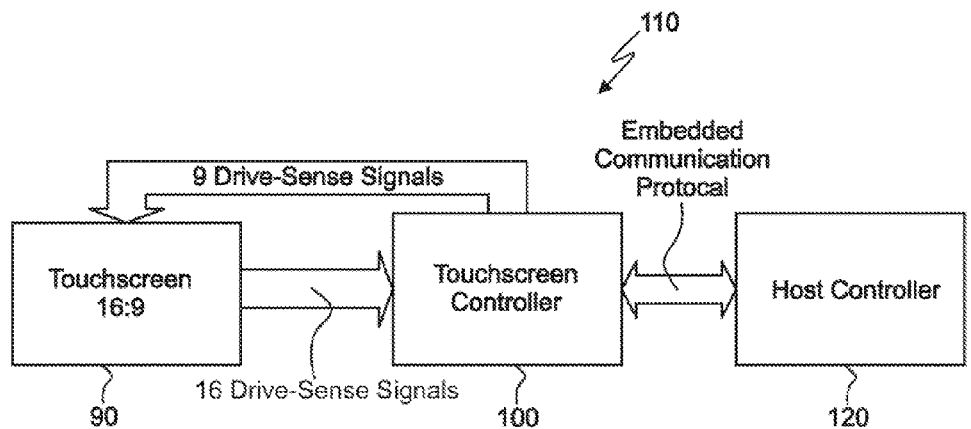
FIG. 3 shows one embodiment of a block diagram of a capacitive touchscreen system and a host controller.
Figure 4:
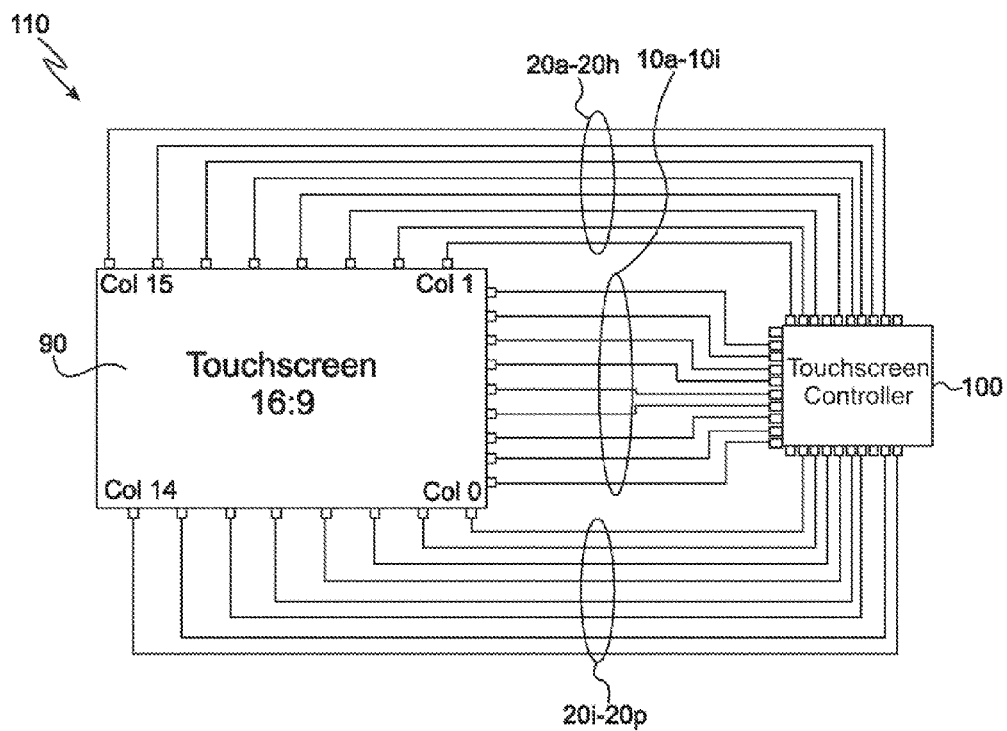
FIG. 4 shows a schematic block diagram of one embodiment of a capacitive touchscreen system.

Capacitive touchscreens or touch panels 90 shown in FIGS. 3 and 4 can be is formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plat 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players; mobile internet devices (MIDs), and GPS devices.

Referring now to FIGS. 3 and 4, in one embodiment the touchscreen controller 100 includes an analog front end with 9 sense and drive signal lines and 16 drive and sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode. However, as power consumption is reduced the response time to touches increases.

According to one embodiment, and as shown in FIG. 4, an ITO grid or other electrode configuration on touchscreen 90 comprises drive columns 20a-20p and sense rows 10a-10i, where drive columns 20a-20p are operably connected to corresponding drive circuits and rows 10a-10i are operably connected to corresponding sense circuits. One configuration for routing ITO or other drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different is numbers of drive and sense lines, and different numbers and configurations of drive and sense electrodes, other than those explicitly shown herein may be employed without departing from the scope or spirit of the various embodiments of the invention.

Figure 5:
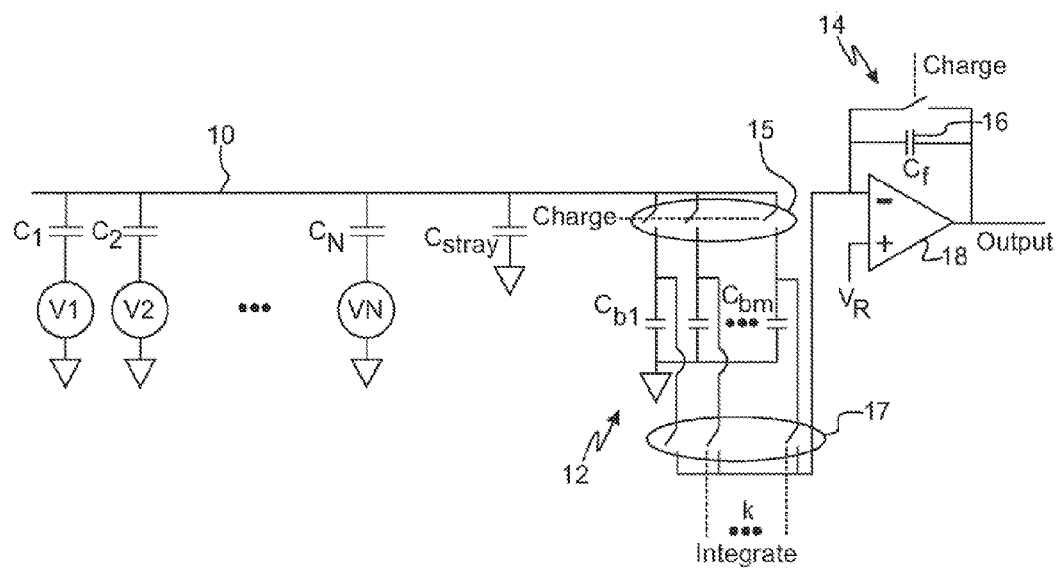
FIG. 5 shows one embodiment of a single sense line 10 operably connected to a charge acquisition circuit and a corresponding charge integrator circuit.

Referring now to FIG. 5, there is shown one embodiment of a single sense electrode or line 10 operably connected to charge acquisition circuit 12. Sense electrode or line 10 provides input charge signals representative of mutual capacitances $C_1$ through $C_N$ and $C_{stray}$ to the input of charge acquisition circuit 12. Integrated charge output signals are provided by charge acquisition circuit 12 to the input of charge integrator circuit 14. Note that circuits 10, 12 and 14 of FIG. 5 represent the circuitry associated with sensing a single sense electrode or line 10, and that in a touchscreen 90 having multiple sense lines, the circuitry of FIG. 5 is repeated for each sense line or electrode. In one embodiment, FIG. 5 represents the circuitry associated with a single touch sensor pixel on touchscreen 90.

Continuing to refer to FIG. 5, charge acquisition circuit 12 comprises a bank of capacitors $C_{b1}$ through $C_{bm}$ having relatively small values (e.g., between about 50 femtofarads and about 1 picofarad) arranged in parallel with respect to one another, each of which is switchably and operably connectable to sense electrode or line 10. As mentioned above, in one embodiment all drive lines or electrodes are driven simultaneously (as represented by $V_1$ through $V_N$). Depending on gain requirements, some or all of capacitors $C_{b1}$ through $C_{bm}$ in charge acquisition circuit 12 are pre-charged during the active drive phase when the top switches in circuit 12 of FIG. 5 are closed (switches 15) and the bottom switches in circuit 12 of FIG. 5 are open (switches 17), followed by multiplexing or otherwise transferring the charges in such capacitors under the control of sense processor (included in controller 100) to the input of charge integrator circuit 14 when top switches 15 of FIG. 5 are open and the bottom switches 17 of circuit 12 are closed.

Note that the gain of charge acquisition circuit 12 shown in FIG. 5 is determined by the number of capacitors $C_{b1}$ through $C_{bm}$ that are charged during a given sensing cycle, which in turn is controlled by actuating or not actuating selected ones of the top switches of charge acquisition circuit 12. The closing and opening of such top switches 15 of FIG. 5 is done under the control of drive and sense control circuitry incorporated into controller 100, which in one embodiment includes charge acquisition circuits 12 and charge integrator circuits 14.

The resulting transferred charge signal is then provided to integrator feedback capacitor 16 of charge integrator circuit 14 and becomes available at the output of charge integrator circuit 14 for further processing. Feedback capacitor 16 of charge integrator circuit has a capacitance value that is preferably about the same as or smaller than that of the combined capacitance of capacitors $C_{b1}$ through $C_{bm}$ of acquisition circuit 12 or smaller. Compared to prior art sensing circuitry for capacitive touchscreens, charge acquisition circuit 12 and charge integrator circuit 14 provide the benefits of lower power consumption, increased operational stability, substantially reduced integrated circuit area, and increased temperature stability provided by integrated capacitors, and not by, for example, active current division circuitry components.

Figure 6:
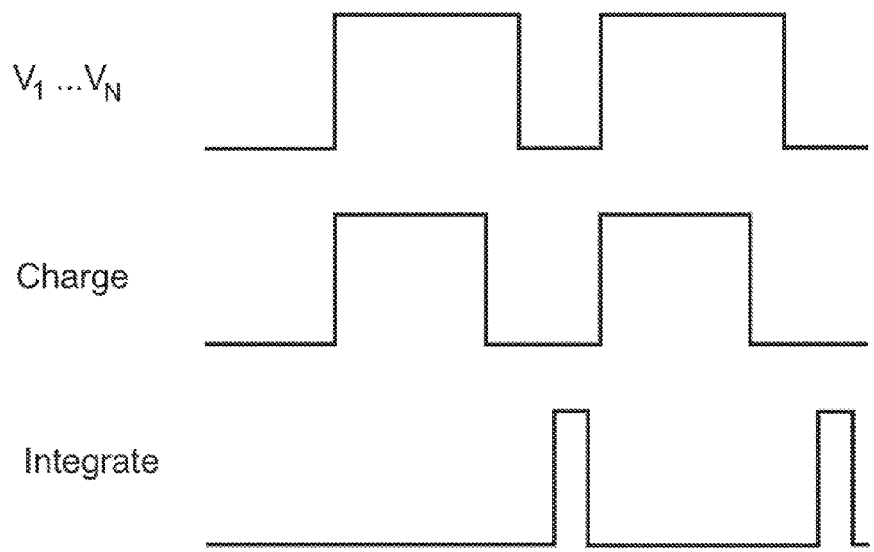
FIG. 6 shows one embodiment of a sequence of control signals corresponding to the circuit of FIG. 5.

FIG. 6 shows two cycles of one embodiment of a command control sequence for the circuitry of FIG. 5. One sense line with pixel capacitors $C_1$-$C_N$ is loaded into charge acquisition circuit 12 as described above. Capacitors $C_{b1}$ through $C_{bm}$ are connected electrically in parallel with the input stray capacitance $C_{stray}$ when the top charging switches in FIG. 5 are closed by the 'Charge' signal at is a logical high state. Individual pixel capacitors $C_1$ through $C_N$ are charged by drive voltage drive sources $V_1$-$V_N$, which in one embodiment are simultaneously driven and active for a time period longer than the 'Charge' signal in a logical high state. After charging of capacitors $C_{b1}$ through $C_{bM}$ has been completed, a selected number of capacitors k from among capacitors $C_{b1}$ through $C_{bM}$ is connected to the input of charge integrator circuit 14, which was previously reset during or before period of time during which charge acquisition circuit 12 was being charged. As shown in FIG. 6, charge integration occurs when the 'Integrate' control signal is switched to a logical high state. In FIG. 5, top switches 15 and bottom switches 17 are closed when a control signal provided thereto is in a logical high state, as is the switch of integrator feedback capacitor 14. The output signal provided by charge integrator circuit 14 is used in further processing before the charge integrator circuit is reset in the next 'Charge' time period.

Using the law of conservation of charge, the voltage appearing at the output of the charge integrator circuit 14 at the end of the read cycle may be defined by the expression:

$$Vout = V_R - \frac{V_{drh}}{C_f} \frac{k(N - N_l)CC_b}{NC + MC_b + C_{stray}} \quad (1)$$

where $V_R$ is the virtual ground reference voltage for charge integrator circuit 14, $V_{drh}$ is the drive voltage in a high state, N is the total number of drive lines, $N_1$ is the number of drive lines in a low state (zero) such that $N-N_1$ equals 1 when one drive line is driven, M is the number of capacitors in charge acquisition circuit 12, C is the pixel or mutual capacitance value, $C_b$ is the capacitor value for a capacitor in charge acquisition circuit 12, $C_{stray}$ is the stray capacitance value (which includes the sense line self-capacitance), $C_f$ is the value of feedback capacitor 16 of charge integrator circuit 14, and k=the number of charge capacitances presented to the input of charge integrator circuit 14 corresponding to the number of individual capacitors $C_{b1}$ through $C_{bm}$ of charge acquisition circuit 12. The output voltage $V_{out}$ is a monotonically rising function of pixel mutual capacitance C, which is the signal that is to be measured.

Figure 7:
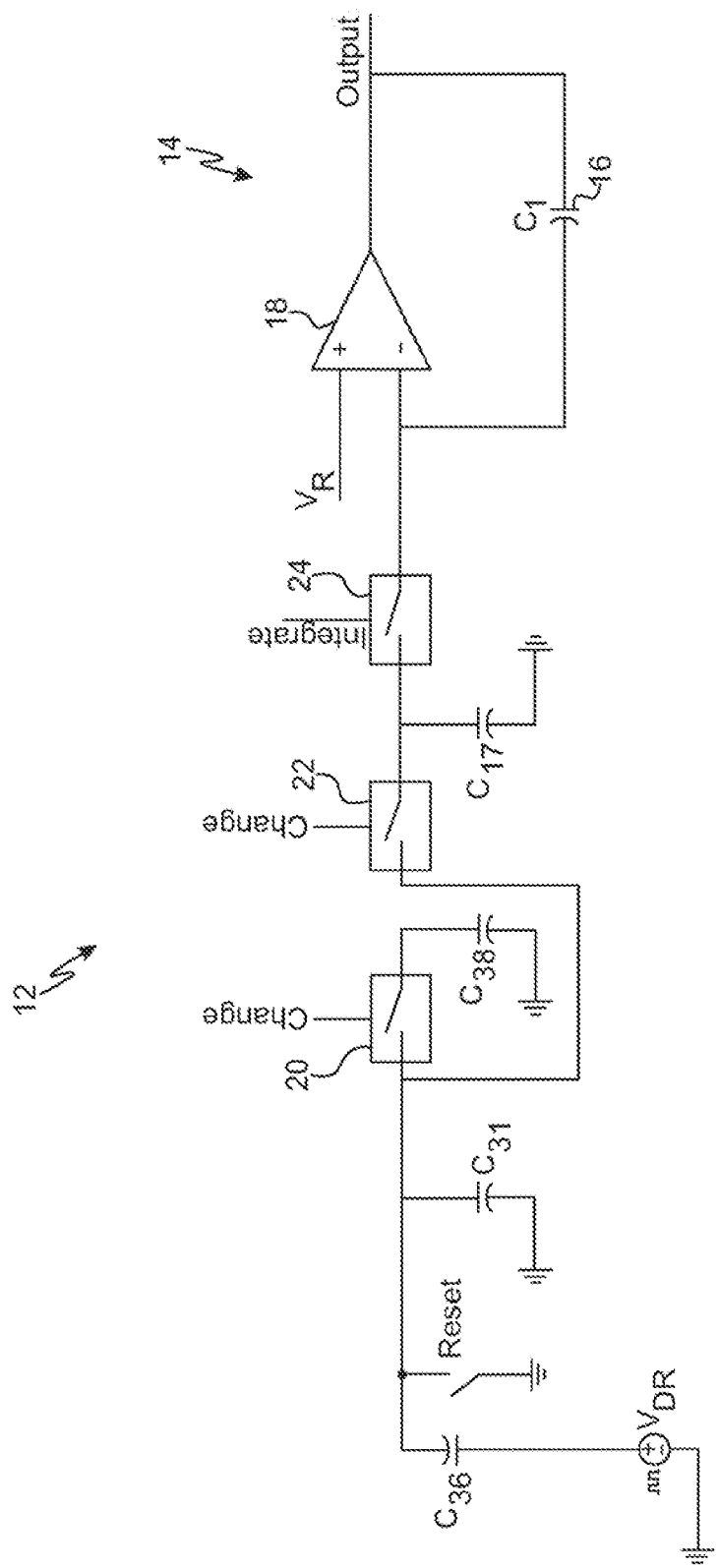
FIG. 7 shows another embodiment of a charge acquisition circuit and a corresponding charge integrator circuit.

FIG. 7 shows another embodiment of charge acquisition circuit 12 and charge integrator circuit 14, which was employed to generate simulated circuit responses. In the circuit simulation, 20 pixel capacitors, each having a value of 4 pF, were simultaneously driven by a voltage source $V_{DR}$. Ten capacitors (the number ten corresponding to M in equation (1)), each having a value of 0.2 pF, were employed in charge acquisition circuit 12. Feedback capacitor 16 was assigned a value of 1 pF. Capacitance $C_{36}$ in FIG. 7 represents the pixel capacitance of the 20 pixel capacitors arranged in parallel. $C_{31}$ represents $C_{stray}$. $C_{38}$ represents M-k capacitors of capacitors $C_{b1}$ through $C_{bm}$ (eight capacitors for k=2, or nine capacitors for k=1). $C_{17}$ represents k capacitors of capacitors $C_{b1}$ through $C_{bm}$ (two capacitors for k=2, or one capacitor for k=1). Control signals "Charge" and "Integrate" are used to control the operation of switches 20, 22 and 24 of charge acquisition circuit 12. When switches 20 and 22 close in response to the receipt of a high state control signal, capacitors $C_{b1}$ through $C_{bm}$ are charged. Switch 24 connects the output of charge acquisition circuit 12 to the input of charge integrator circuit 14 upon the receipt of a high state control signal.

Figure 8:
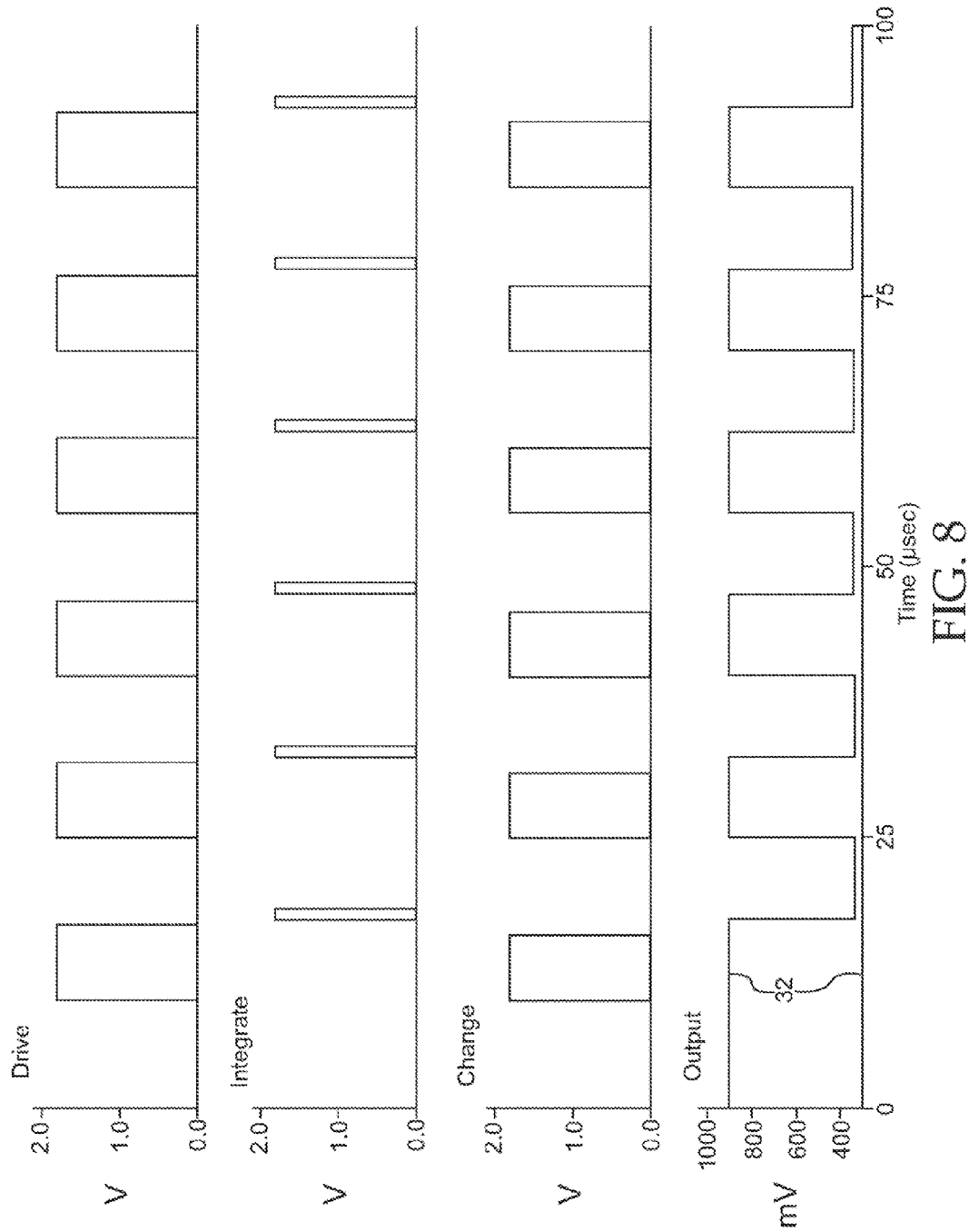
FIG. 8 shows various simulated signals corresponding to the circuit of FIG. 7, and FIG. 9 analytical and simulated stray capacitance responses provided by the circuit of FIG. 7.

Circuit simulation results are shown in FIG. 8, where a 15 μsec readout cycle with a charging time of 6 μsec. and an integration time of 1 μsec were employed. For a stray capacitance of 20 pF and a drive voltage of 1.8 volts, the voltage difference in reset and charged states at the output of charge integrator circuit 14 is 564.6 mV for a gain of k=2 (see numeral 32 in FIG. 9). Note that no reset signal is shown in FIG. 8, although in many cases a reset signal will be provided.

Figure 9:
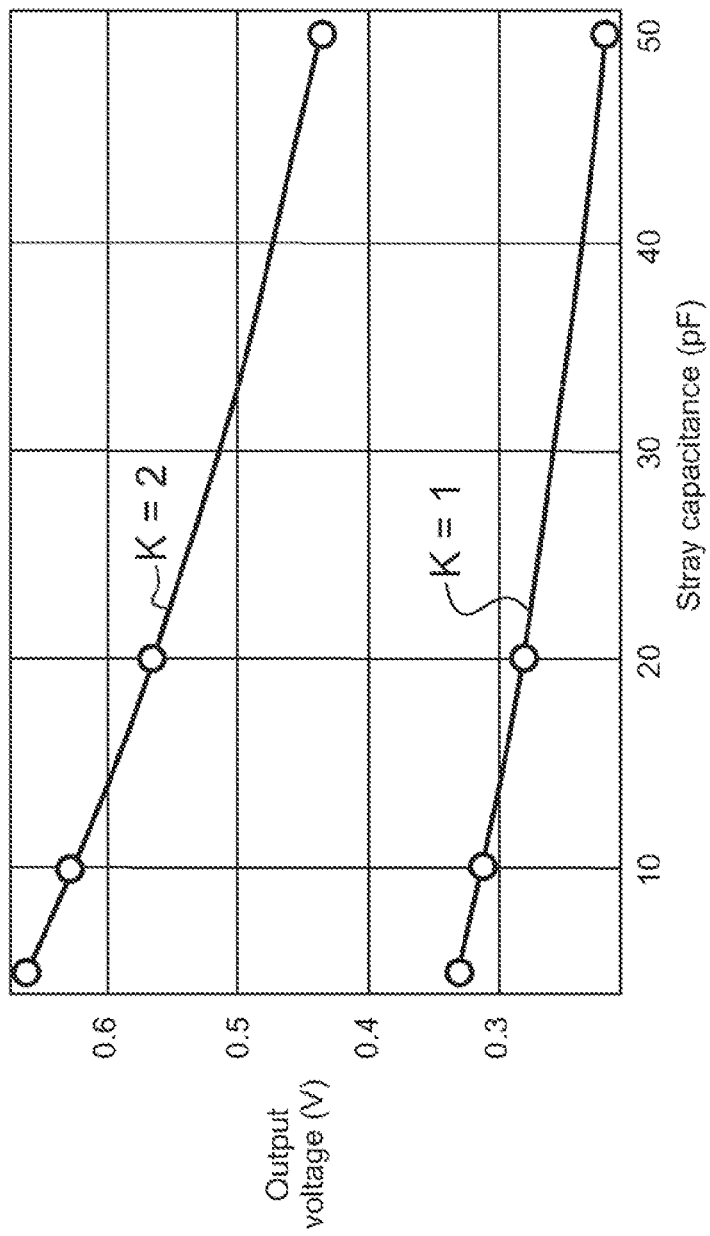

FIG. 9 shows a comparison between the charge integrator circuit output voltage swing as a function of stray capacitance value for two gain values, k=1 (the lower curve of FIG. 9) and k=2 (the upper curve of FIG. 9). The results of analytical calculations are represented by the continuous lines of FIG. 9. Simulated results, shown by circles, very closely match the analytical results for voltage swings obtained using equation 1.

Note further that the operation of the first (or top) input switches 15 and the second (or bottom) output switches 17 of charge acquisition circuit 12 in FIG. 5 may be controlled by a drive/sense processor operably connected to each sense circuit. Moreover, a gain of each charge acquisition circuit 12 may be determined by closing a predetermined number of first input switches 15, and the gain of each charge acquisition circuit 12 may be configured to permit less than the full charge present on the sense electrode 10 corresponding thereto to be stored in such charge acquisition circuit 12. In some embodiments, charge integrator circuit 14 may comprise an operational amplifier, an operational amplifier comprising a sample and hold capacitor operably connected to a negative input terminal and an output of the operational amplifier, or a transconductance amplifier. A reset circuit is typically provided to drain charge remaining on each of the sense electrodes after a sense cycle has been completed. The drive and sense circuits may be incorporated into and form a portion of an integrated circuit. Such an integrated circuit may be one of a processor, a controller or an application specific integrated circuit (ASIC), and the integrated circuit may be formed using a CMOS or BiCMOS process.

Note that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, various embodiments of capacitive touchscreen system 110 and capacitive touchscreen 90 are not limited in scope to drive electrodes disposed in rows and sense electrodes disposed in columns. Instead, rows and columns are interchangeable in respect of sense and drive electrodes. Various embodiments various embodiment of capacitive touchscreen system 110 and capacitive touchscreen 90 are also capable of operating in conjunction with a stylus, such that stylus touches on touchscreen 90 are detected. System 110 and touchscreen 90 may further be configured to permit the detection of both of finger touches and stylus touches.

Note further that included within the scope of the present invention are methods of making and having made the various components, devices and systems described herein. By way of example, in one embodiment there is provided a method of measuring charges associated with mutual capacitances in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, the mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches, the input signals comprising mutual capacitances and stray capacitances, each charge acquisition circuit further being operably connected to a corresponding charge integrator circuit to provide output signals thereto through the second output switches, the method comprising closing the first input switches of the charge acquisition circuit such that the capacitive input signal provided by the corresponding one of the second plurality of electrodes is transferred to the plurality of capacitors corresponding thereto, and opening the first switches and closing the second switches such that the stored charge signals corresponding to each of the capacitors in the charge acquisition circuit are transferred to the charge integrator circuit through the second switches. Further steps in such a method may include operating the first input switches and the second output switches under the control of a drive/sense processor operably connected to the sense circuit, determining a gain of each charge acquisition circuit by closing a predetermined number of the first input switches, storing less than the full charge present on the corresponding electrode in the charge acquisition circuit, and draining charge remaining on each of the second plurality of electrodes after a sense cycle has been completed.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touchscreen system, comprising:
   a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes; one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches wherein a gain of each charge acquisition circuit is determined by closing a predetermined number of the first input switches, the input signals representing mutual capacitances and stray capacitances, each charge acquisition circuit further being operably connected to a corresponding charge integrator circuit to provide output signals thereto through the second output switches;
   wherein when the first input switches of each charge acquisition circuit are closed the capacitive input signals provided thereto by the second plurality of electrodes are transferred to the plurality of capacitors corresponding thereto, and when the first switches are subsequently opened and the second switches are closed the stored charge signals corresponding to each of the capacitors in the charge acquisition circuit are transferred to the charge integrator circuit through the second switches.

2. The touchscreen system of claim 1, wherein the gain of each charge acquisition circuit permits less than the full charge present on the electrode corresponding thereto to be stored in the charge acquisition circuit.

3. A processor for a capacitive touchscreen comprising a first plurality of electrically conductive electrodes arranged in rows or columns, and a second plurality of electrically conductive electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought, into proximity thereto, stray capacitances being associated with each of the second plurality of electrodes, the processor comprising:
   one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches wherein a gain of each charge acquisition circuit is determined by closing a predetermined number of the first input switches, the input signals comprising mutual capacitances and stray capacitances, each charge acquisition circuit further being operably connected to a corresponding charge integrator circuit to provide output signals thereto through the second output switches;

wherein when the first input switches of each charge acquisition circuit are closed the capacitive input signals provided thereto by the second plurality of electrodes are transferred to the plurality of capacitors corresponding thereto, and when the first switches are subsequently opened and the second switches are closed the stored charge signals corresponding to each of the capacitors in the charge acquisition circuit are transferred to the charge integrator circuit through the second switches.

4. The processor of claim 3, wherein the gain of each charge acquisition circuit permits less than the full charge present on the electrode corresponding thereto to be stored in the charge acquisition circuit.

5. A method of measuring charges associated with mutual capacitances in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, the mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of electrodes, and a plurality of sense circuits, each of the plurality of sense circuits being operably connected to a corresponding one of the second plurality of electrodes, each sense circuit comprising a charge integrator circuit and a charge acquisition circuit comprising a plurality of capacitors arranged in parallel respecting one another, first input switches and second output switches corresponding to each of the capacitors in the charge acquisition circuit, each charge acquisition circuit being operably connected to a corresponding electrode from among the second plurality of electrodes to receive input signals therefrom through the first input switches, the input signals comprising mutual capacitances and stray capacitances, each charge acquisition circuit further being operably connected to a corresponding charge integrator circuit to provide output signals thereto through the second output switches, the method comprising:

closing the first input switches of the charge acquisition circuit such that the capacitive input signal provided by the corresponding one of the second plurality of electrodes is transferred to the plurality of capacitors corresponding thereto, and opening the first switches and closing the second switches such that the stored charge signals corresponding to each of the capacitors in the charge acquisition circuit are transferred to the charge integrator circuit through the second switches; and determining a gain of each charge acquisition circuit by closing a predetermined number of the first input switches.

6. The method of claim 5, further comprising storing less than the full charge present on the corresponding electrode in the charge acquisition circuit.

\* \* \* \* \*